US006478926B1

(12) United States Patent
Brachos et al.

(10) Patent No.: US 6,478,926 B1
(45) Date of Patent: Nov. 12, 2002

(54) APPARATUS AND METHOD FOR FORMING STRUCTURAL PREFORMS

(75) Inventors: Vasilios Brachos, Lowell; Vincent Borbone, Shrewsbury, both of MA (US)

(73) Assignee: Solectria Corporation

( * ) Notice: Subject to any disclaimer, the term of this patent is extended or adjusted under 35 U.S.C. 154(b) by 0 days.

(21) Appl. No.: 09/540,604

(22) Filed: Mar. 31, 2000

(51) Int. Cl.[7] .............................................. B30B 5/02
(52) U.S. Cl. .............................. 159/379.8; 156/380.9; 156/382; 156/583.3; 425/174.4; 425/388
(58) Field of Search .............................. 156/285, 286, 156/379.6, 379.8, 380.9, 382, 580, 583.3, 583.91; 425/110, 125, 126.1, 174, 174.4, 417, 504, 388, 405.1; 264/408, 410, 101

(56) References Cited

U.S. PATENT DOCUMENTS

| | | | |
|---|---|---|---|
| 4,034,054 A | 7/1977 | Sauer | 264/93 |
| 4,776,915 A | 10/1988 | Natori et al. | 156/274.8 |
| 4,952,366 A | 8/1990 | Gelin | 264/511 |
| 5,002,476 A | 3/1991 | Kerr | 425/174.004 |
| 5,192,387 A | 3/1993 | Buckley | 156/275.5 |
| 5,217,656 A | 6/1993 | Buckley et al. | 264/22 |
| 5,318,650 A | 6/1994 | Kerawalla | 156/245 |
| 5,328,540 A * | 7/1994 | Clayton et al. | 156/285 |
| 5,332,536 A | 7/1994 | Boeckeler | 264/22 |
| 5,338,169 A | 8/1994 | Buckley | 425/82.1 |
| 5,364,258 A | 11/1994 | Buckley et al. | 425/501 |
| 5,382,148 A * | 1/1995 | Buckley | 156/275.5 |
| 5,487,853 A | 1/1996 | Buckley | 264/496 |
| 5,827,392 A | 10/1998 | Buckley et al. | 156/275.3 |
| 5,866,060 A | 2/1999 | Buckley | 264/463 |

OTHER PUBLICATIONS

Rossi, G.A. et al., "Solectria Sunrise™ Electric Vehicle Technology", SPE RETEC, 147 (Mar. 1998), pp. 1–7.
Hull, B.H., "Hybrid Molding Processes Can Break The "Economics vs. Requirements" Barrier For Structural Composites", 41st International SAMPE Symposium, Mar. 24–28, 1996, pp. 1563–1572.
Greve, B.N., "Efficient Composite Fabrication Using Slurry Preforms", 29th International SAMPE Technical Conference, Oct. 28–Nov. 1, 1997, pp. 32–41.
Marshall, M. et al., "The Use Of Directed Fiber Preforms In Automotive Bumper Beam Components", 29th International SAMPE Technical Conference, Oct. 28–Nov. 1, 1997, pp. 1–7.
Gerard, J.H. et al., "Owens–Corning P–4 Technology—The Latest on this New Process", 48th Annual Conference Composites Institute, The Society Of The Plastics Industry, Inc., Feb. 8–11, 1993, pp. 1–9.
Buckley, D.T., "Complex Preforms In Net Shape And High Volumes", 29th International SAMPE Technical Conference, Oct. 28–Nov. 1, 1997, pp. 10–20.
Brachos, V. et al., "Design Considerations for Cost–Effective High Rate Preforming and RTM for Large Composite Structures", Annual Advanced Composites Technology Conference and Exposition (1998), pp. 1–11.
Sarhadi, M. et al., "Robotic Lay–Up of High–Quality Composite Preforms", pp. 215–226.

* cited by examiner

Primary Examiner—Michael W. Ball
Assistant Examiner—John T. Haran (57) ABSTRACT

Apparatus and process to form structural preforms from an electromagnetic energy activated binder and reinforcing material using low cost tooling. The apparatus includes one or more lay-up stations and forming stations.

22 Claims, 9 Drawing Sheets

APPARATUS AND METHOD FOR FORMING STRUCTURAL PREFORMS

GOVERNMENT RIGHTS

The invention was supported under Government Contract No. 70NANB5H1172 through NIST. The government has certain rights to the invention.

FIELD OF THE INVENTION

The present invention relates to an improved apparatus and method for forming structural preforms.

BACKGROUND OF THE INVENTION

From the sports industry to the marine and the automotive industry, composite materials are being pursued as the material of choice for their low weight and cost effective production methods. Reinforcing fibers can be combined to make many different fiber architectures. Based on structural integrity and fiber linearity and continuity, fiber architectures can be classified into four categories: discrete, continuous, planar interlaced (2-D), and fully integrated (3-D) structures.

A discrete fiber system like a fiber mat has the least reinforcement material continuity. The continuous filament or unidirectional (0°) system has the highest level of fiber continuity and linearity, and consequently has the highest level of property translation efficiency from the fiber to the composite product. The drawback of this fiber architecture is its intra-and inter-laminar weakness due to the lack of in-plane and out-of-plane yarn inter-lacings. The planar interlaced or inter-looped systems, which include architectures like 2-D woven and knitted fabrics, address the intralaminar failure problem but the inter-laminar strength is still limited by the matrix strength due to the lack of through thickness fiber reinforcements. The last category includes fully integrated systems that have a tree dimensional network of yarn bundles.

Textile preforming provides a link between raw material systems and the molding of the composite product. Depending upon the textile preforming method used, the range of fiber orientation and fiber volume fraction of the preform will vary, subsequently affecting matrix infiltration and consolidation and therefore can change the structural performance of the composite product.

Currently, low-cost preforming in the automotive industry is generally done using either a variation of the directed fiber process or by matched die forming of a thermoformable continuous strand mat, with little effort concentrating on structural fabrics. The existing preforming techniques meet high rate and low cost requirements, however, the structural requirements for a highly loaded, low weight composite part cannot be reached easily without the use of continuous fiber reinforcement fabrics. Following is a list of current preforming techniques:

Discontinuous Fiber Preforming
Directed chopped fiber with polyester binder;
Programmable powder preform process "(P4)", automated chopper gun;
Dow thermal spray chop gun (manual and robotic);
Chopped mat—Matched tool thermoforming;
Chopped fiber slurry
Continuous Fiber Preforming
Continuous Strand Mat (CSM)—Matched tool thermoforming
Stitching
Hand Lay-up
Dry filament winding
Braiding
CompForm (Mat, multi warp knit "(MWK)", Woven)
Diaphragm thermoforming (Mat, MWK, Woven)

Most of the current techniques for forming engineered fabrics make use of the mold tool, hand lay-up of plies, vacuum bag consolidation and convection oven heating methods that prolong the forming cycle. Rarely is a tool string dedicated specifically to forming the reinforcing fabric, with the exception of the CompForm process which requires matched die sets. Stitching methods attach one layer of fabric to the next or connect one piece to another, but in either instance, the resultant preform is limp and unconsolidated. Random continuous and discontinuous glass mat is often formed at high rate using matched die thermoforming. The random fiber orientation limits application of the resulting composite to secondary structural applications where fiber loading of 45 percent by weight is sufficient.

Other techniques for preform fabrication are based on discontinuous or chopped fibers. These techniques use a screen and require fluid (air or water) flow to trap the fiber against the porous tool surface. Air born, directed fiber systems are improving with respect to controlling fiber angle and placement, culminating in the "P4" process. Manual chopper gun/screen methods have been used since the 1950s. By maintaining the fiber alignment, stiffness remains in tack, but in all cases the discontinuity and misalignment of the fiber lowers the maximum theoretical fiber volume and greatly reduces the laminate strength.

SUMMARY OF THE INVENTION

In a first embodiment, Applicants' novel apparatus comprises a lay-up station and a forming station. A shuttle table moves bidirectionally from the lay-up station into the forming station and back to the lay-up station. A forming tool comprising a first mold part which defines the 3-dimensional shape of the desired structural preform is disposed on the shuttle table.

The forming station includes two independently movable horizontal platens. A press platen includes an elastomeric diaphragm which functions as a second mold part. An emitter platen disposed above the press platen includes a plurality of electromagnetic energy emitting devices.

An electromagnetic energy curable binder composition is applied to one or more layers of reinforcing material and that coated reinforcing material is laid up onto the forming tool in the lay-up station. The shuttle table is then moved into the forming station and secured in place. The press platen is lowered such that the elastomeric diaphragm stretches to encapsulate the coated reinforcing material/forming tool thereby forming the coated reinforcing material into the shape of the preform.

The spatial orientation of the plurality of energy emitting devices is adjusted and the emitter platen is then lowered to near vicinity of the stretched elastomeric diaphragm. Electromagnetic energy is directed through the elastomeric diaphragm into the binder coated reinforcing material to heat and form the structural perform under pressure. After the curing cycle is complete, the diaphragm is cooled. In another embodiment, the elastomeric diaphragm is also cooled during the curing cycle.

After completion of the curing and cooling cycles, the shuttle table is returned to the lay-up station and the structural preform is removed from the forming tool. As those skilled in the art will appreciate, movement and securing of the shuttle table may be performed manually or may be automated.

In another embodiment, a second lay-up station is added to the apparatus described above. In this embodiment, one lay up station can be used to lay-up the uncured reinforcing material onto the forming tool where the material is heated and formed under pressure into a structural perform, and the other lay-up station used to remove the formed structural preform from the forming tool.

In another embodiment, Applicants' apparatus comprises a plurality of lay-up stations alternating with a plurality of forming stations as above described. In this embodiment, more complex preforms can be manufactured by sequential lay-up and forming operations.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
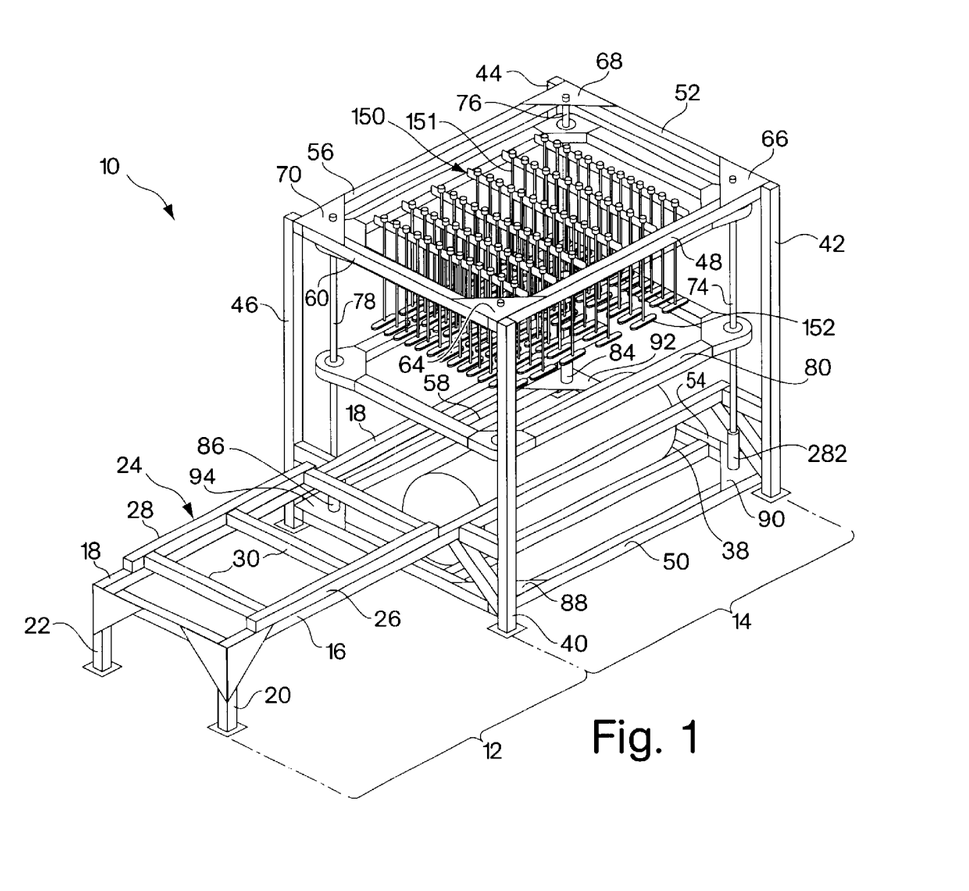
FIG. 1 is a perspective view of a preferred embodiment of an apparatus embodying the principals of the present invention.

FIG. 1 depicts a first embodiment 10 of apparatus to prepare structural preforms in accordance with the present invention. Apparatus 10 comprises two major components, namely lay-up station 12 and forming station 14. Lay-up station 12 extends outwardly from the first side of forming station 14.

Lay-up station 12 includes first rail 16 and second rail 18 spaced equidistantly apart. The distal end of first rail 16 is attached to the top portion of first leg 20, with the proximal end of first rail 16 extending through the first side of forming station 14 and attached to the opposite side of forming station 14 such that first rail 16 is essentially level from one end to the other. Similarly, the distal end of second rail 18 is attached to the top portion of second leg 22, with the proximal end of second rail 18 extending through the first side of forming station 14 and attached to the opposite side of forming station 14 such that second rail 18 is essentially level from one end to the other.

Shuttle table 24 is formed from first side 26 and second side 28 which are equidistantly connected to one another by a plurality of members 30. First side 26 of shuttle table 24 is slidingly attached to first rail 16, and second side 28 of shuttle table 24 is slidingly attached to second rail 18, such that shuttle table 24 can be moved bidirectionally along rails 16 and 18 from the distal end of lay-up station 12 to the interior portion of forming station 14, and then back.

Figure 2:
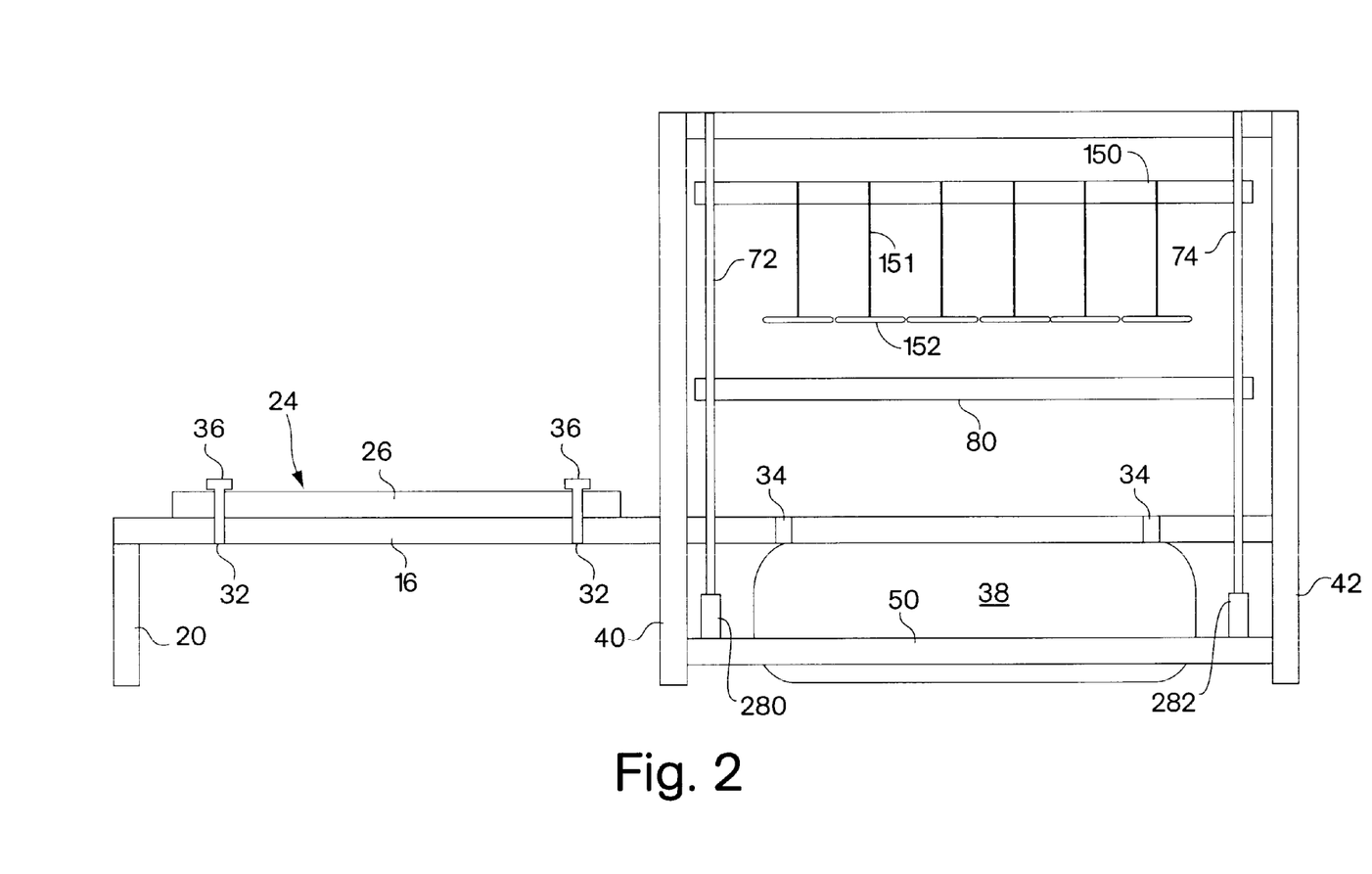
FIG. 2. is a side view of the apparatus of FIG. 1.

Turning to FIG. 2, first side 26 of shuttle table 24 includes a plurality of first locking pins 36 extending through first side 26 from top to bottom and having a length of about two times the height of first side 26. First locking pins 36 have an unlocked position wherein the bottom ends of first locking pins 36 rest along the top surface of first rail 16, and a locked position wherein those pins have been moved downwardly into and through a plurality of first holes 32, or second holes 34, disposed from top to bottom through first rail 16. First holes 32 are disposed through the distal end of first rail 16, and second holes 34 are disposed through the proximal end of first rail 16. When first locking pins 30 are urged downward into the locked position through first holes 32, shuttle table 24 is immobilized at lay-up station 12. When first locking pins are urged downward into the locked position through second holes 34, shuttle table 24 is immobilized at forming station 14.

Second side 28 of shuttle table 24 optionally may also include a plurality of second locking pins 38 (not shown) which can be moved downwardly into and through a corresponding plurality of holes disposed from top to bottom through the distal and/or proximal ends of second rail 18. First locking pins 36 and optional second locking pins 38 can be moved between the unlocked and locked positions manually or through use of mechanical actuators.

Turning again to FIG. 1, forming station 14 comprises a four-sided, roughly rectangular, open frame structure formed from four parallel vertical members which define the corners of said frame. First horizontal member 48 connects the top of first vertical member 40 to the top of second vertical member 42. Second horizontal member 50 connects the bottom of first vertical member 40 to the bottom of second vertical member 42.

Similarly, horizontal members 52 and 54 connect vertical members 42 and 44 at the top and bottom, respectively. Horizontal members 56 and 58 connect vertical members 44 and 46 at the top and bottom, respectively. Horizontal members 60 and 62 connect vertical members 46 and 40 at the top and bottom, respectively.

Triangular corner plate 64 is attached to the top of vertical member 40 and to the top surfaces of horizontal members 48 and 60. Shaft 72 (not visible in FIG. 1 but visible in FIG. 2) is attached to, and extends downwardly from, corner plate 64. Triangular corner plate 88 is attached to the top surfaces of horizontal members 50 and 62. Extension 280 connects the bottom of shaft 72 to corner plate 88. Triangular corner plate 66 is attached to the top of vertical member 42, and to the top surfaces of horizontal members 48 and 52. Shaft 74 is attached to, and extends downwardly from, corner plate 66. Triangular corner plate 90 is attached to the top surfaces of horizontal members 50 and 54. Extension 282 connects the bottom of shaft 74 to corner plate 90. Triangular corner plate 68 is attached to the top of vertical member 44, and to the top surfaces of horizontal members 52 and 56. Shaft 76 is attached to, and extends downwardly from, corner plate 68. Triangular corner plate 92 is attached to the top surfaces of horizontal members 58 and 54. Extension 84 connects the bottom of shaft 76 to corner plate 92. Triangular corner plate 70 is attached to the top of vertical member 46, and to the top surfaces of horizontal members 56 and 60. Shaft 78 is attached to, and extends downwardly from, corner plate 70. Triangular corner plate 94 is attached to the top surfaces of horizontal members 58 and 62. Extension 86 connects the bottom of shaft 78 to corner plate 94.

Vacuum surge tank 38 is mounted between horizontal members 54 and 62. Surge tank 38 is connected to an external vacuum source (not shown in FIG. 1) which external vacuum source is sized according to the needs of the particular molding operation.

In order for the reinforcing fabric to properly be formed into the desired shape of the final structural preform, that fabric must be fixtured into such a desired shape during lay-up end throughout the heating and cooling cycle. The present invention includes a vacuum or negative air flow in the lay-up station to assist in holding the pattern in place and in shape, and two independently movable horizontal platens, namely a press platen and an emitter platen.

The press platen includes an elastomeric diaphragm which functions as a mold part. The emitter platen includes a plurality of electromagnetic energy emitting devices. Both platens may be independently raised and/or lowered. Each platen includes an electro-mechanical drive system incorporating servo-control of position, speed, and acceleration.

The electro-mechanical drive system provides a means of motivating and accurately controlling the motion of multiple points along a platen or frame assembly. In a preferred embodiment of the invention, the drive system connects a series of acme or ball screw/nut combinations to provide a redundant, safe drive path, with or without the need of a safety brake depending on the load requirements and selection of lead angle of the drive nuts. Use of electric drive offers a broad choice of motion control ranging from simple on/off (limit switch) control of either AC or DC motor to more sophisticated control of over position, velocity and acceleration through the use of stepper or servo motors. Selection of zero backlash drive nut assemblies and precision lead/ball screws affords unparalleled accuracy at each drive location enabling precise and accurate control over the parallel movement of the platen.

The drive mechanism of the present invention provides a redundant load path, when coupled in a closed loop of three or more gearboxes. The drive mechanism provides precise, accurate control over platen position, speed, and acceleration without the need for additional safety braking systems. The drive mechanism provides precise, accurate control over platen parallelism that is inherent in the linked gearbox design and therefore requires no additional guiding mechanism to obtain control over the parallel motion of the platen. Because the invention employs a fixed lead screw design, it is possible to drive many platens or frame assemblies coaxial along this shared set of lead screws. The fixed screw assembly minimizes dynamic problems. By way of example, a ball screw supported by bearings only at each end and having a length of 102 inches has a rotational speed limit of about 100 rpm. Beyond this speed, the screw begins to whip and behave like a jump rope. The electro-mechanical drive system of the present invention is able to employ speeds of 500 rpm or higher without any problem. Moreover, the fact that the ball nut rotates rather than the screw enables the use of much longer screw lengths. The dynamic coupling of the ball nut and ball screw may be tuned by balancing the rotating components of the gearbox. Alternatively, a light duty, rigid guide (or track) may be used to de-couple the dynamic interaction by limiting platen motion transverse to the direction of platen travel.

Figure 3:
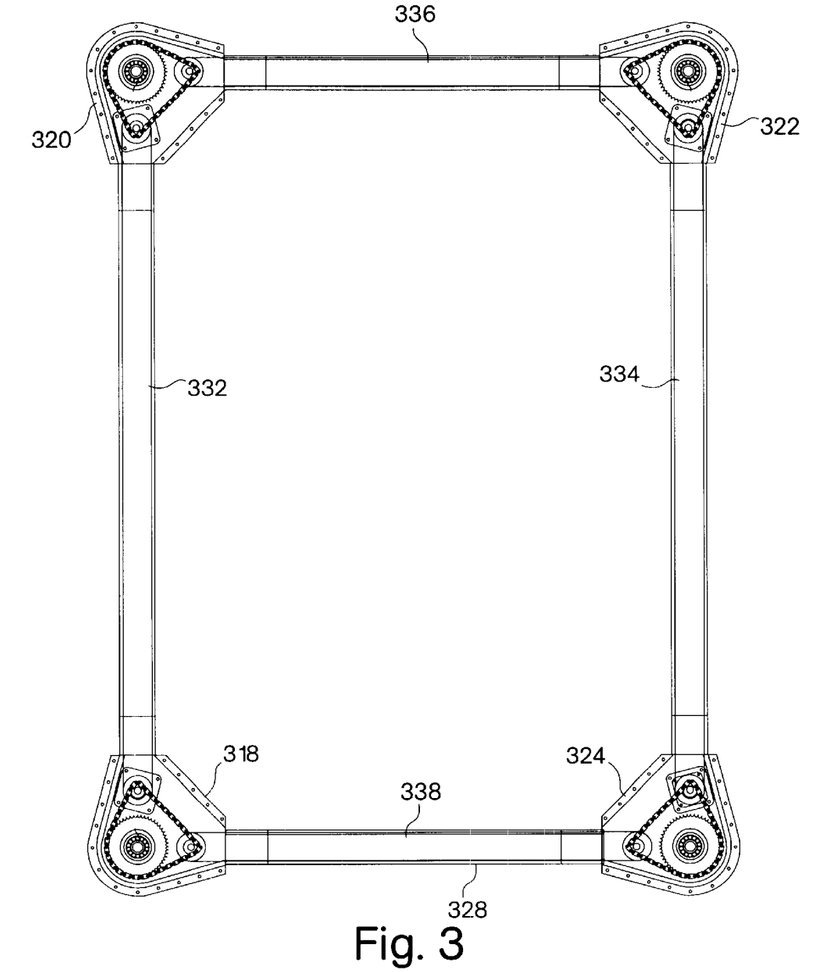
FIG. 3 is a top elevation view of the movable press platen portion of the apparatus of FIG. 1.

Referring to FIGS. 3, 4A, 4B, 5A, 5B and 5C, electro-mechanical drive is achieved through a gearbox 300 at each corner of the press platen. Each gearbox consists of a ball nut 302 connected to two secondary drive-transfer shafts 304, 306 by means of a chain 308 and sprocket 310 arrangement. Coaxial with the drive-transfer sprocket on the rive-transfer shaft 312 is a pulley 314 on one end and a drive motor 316 on the other. The drive motor is required at only one corner 318 as shown in FIG. 3. All other gearboxes 320, 322, 324 are driven by this single drive motor.

In other words, one drive motor supplies the power to all four corners. A pulley 314 and belt 328 arrangement serves as a means of transferring the driving force from corner to corner. By slaving the three remaining corners together as shown in FIG. 3, the drive system becomes inherently redundant. Worth noting is that the corner configuration not be limited to 90°, but that other angles may be employed to enable triangular, pentagonal, hexagonal, etc. press/frame design configurations. By designing the lead angle, or pitch, of the ball nut/screw arrangement to compensate for the platen motion due to platen mass and diaphragm loads, the resultant friction forces eliminate the need for a safety brake. Double redundancy is achieved by having at least one drive-transfer pulley and one drive-transfer sprocket on the same shaft as the drive motor. This four-corner drive also assures platen parallelism throughout the entire stroke of motion.

Figure 3A:
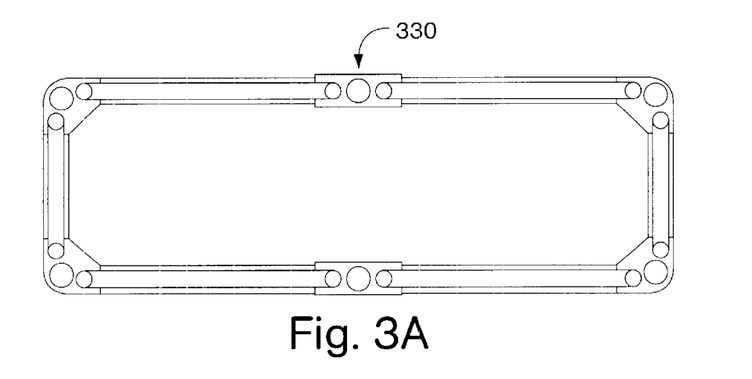
FIG. 3A is a view similar to FIG. 3 of an alternative embodiment of movable press platen in accordance with the present invention.

FIG. 3A shows a schematic of an arrangement for a gearbox 330 located along a straight run (center gearboxes). This second gearbox design allows the design and control of large platen configurations. The use of the inline gearbox is not limited to a single inline gearbox between corner gearboxes. The invention affords the use of any number of inline gearboxes. Likewise, the gearbox design also allows for the use of multiple drive motors, which aids in power distribution for large press/frame designs. Together, the multiple gearbox-drive motor invention enables the design and development of extremely large press/frame structures with uniform load distribution along the frame and accurate/precise control of the press/frame motion and parallelism by mechanical means.

Figure 4A:
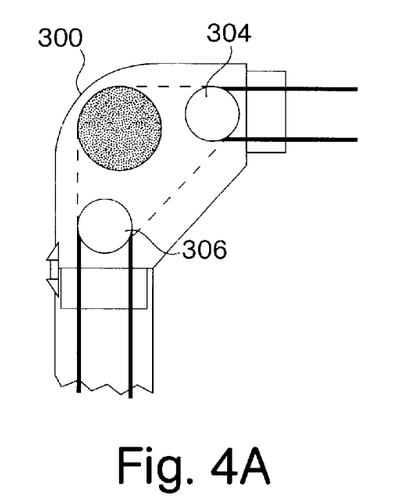
FIGS. 4A and 4B are top plan views similar to FIG. 3, and showing details of the gearbox assembly portion of the press platen of FIG. 3.
Figure 4B:
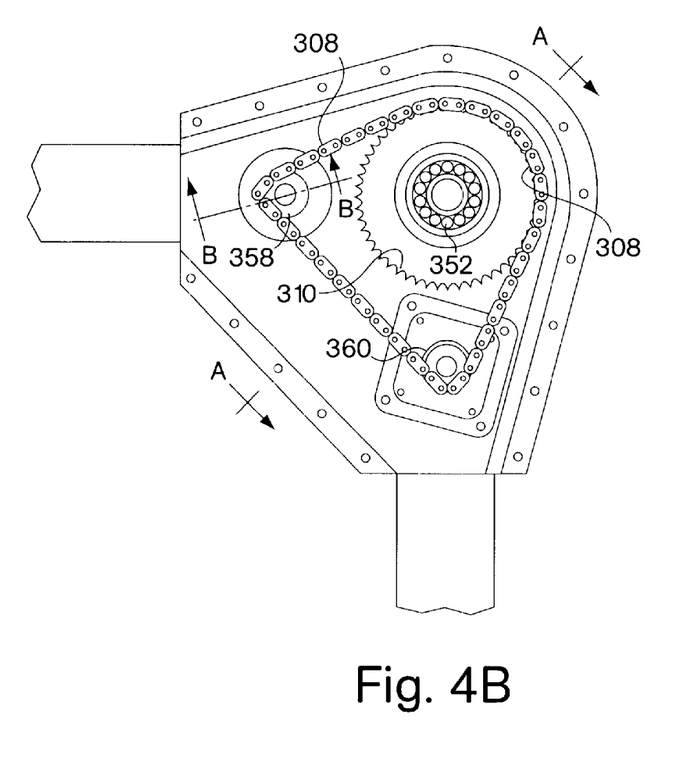
Figure 5A:
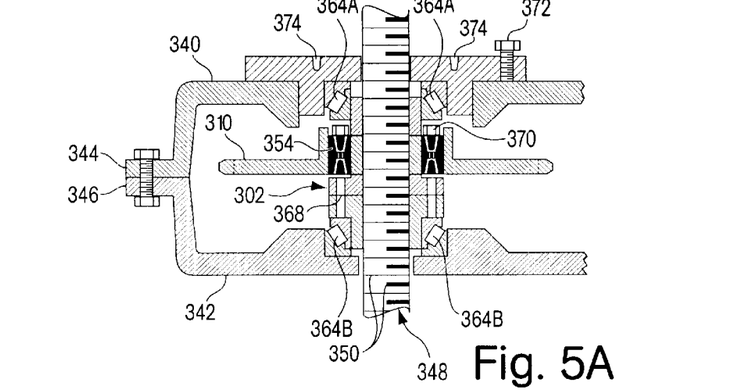
FIG. 5A is a section view taken along V—V of FIG. 4.
Figure 5B:
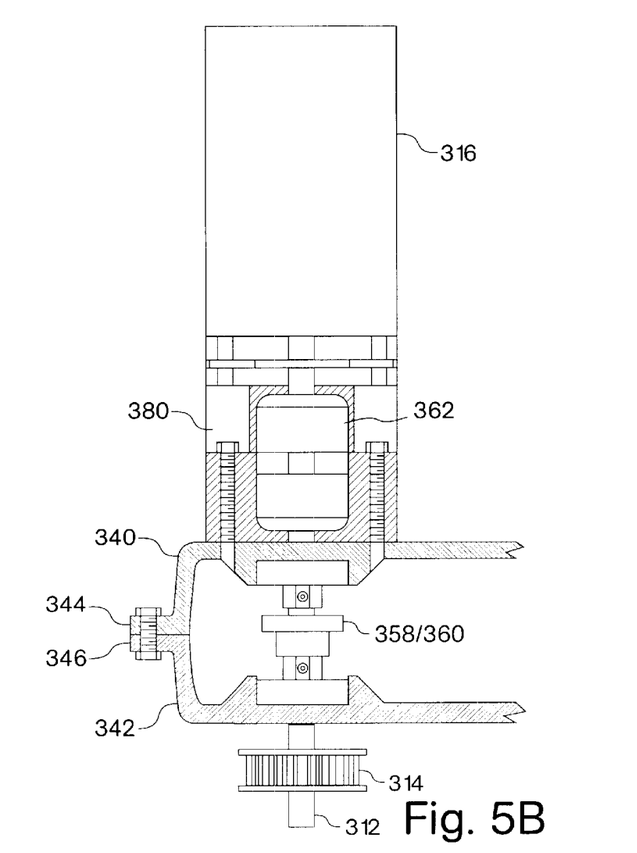
FIG. 5B is a section view taken along VI—VI of FIG. 4.
Figure 5C:
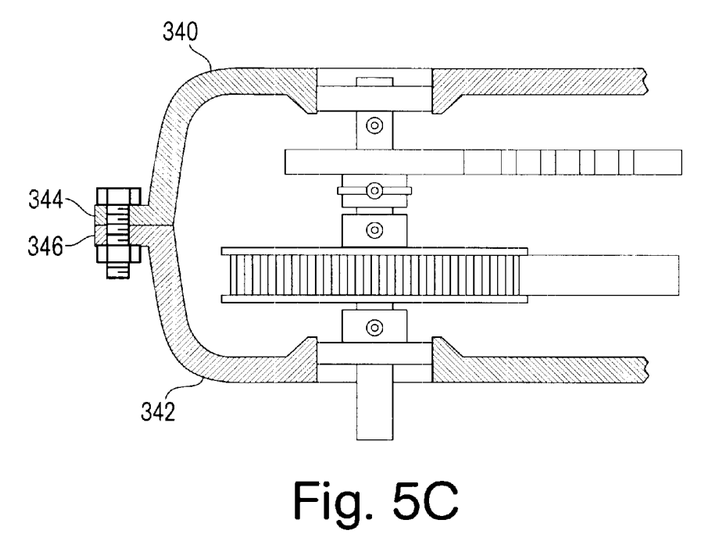
FIG. 5C is a side elevational view of the gearbox assembly of FIG. 4.

FIG. 4B is a plan view of a 90° corner gearbox, and details, together with FIG. 3, the interface of a box beam 332, 334, 336, 338 to connect the gearboxes 318, 320, 322, 324. This connection is made with a direct interface to the gearbox case. Referring also to FIG. 5A, the case consists of two halves 340, 340 that are bolted together along two case flanges 344, 346. The ball screw 348 is shown at the center of the primary drive-transfer (large) sprocket 310. The ball nut 302 applies load to the ball screw 348 via the thread flights 350 by rotating and circulating ball bearings 352 between the thread flights of the screw and nut. The ball nut is connected to the drive sprocket by a tapered lock connection 354 that locks the sprocket to the ball nut by means of friction. The primary drive-transfer sprocket 310 supplies the motivating force to the ball nut, which is driven by a chain 308 linked to two secondary drive-transfer sprockets 358, 360. Each secondary drive-transfer sprocket is mounted to a drive-transfer shaft (using a keyway or other means) which interfaces with the gearbox through a drive-transfer bearing assembly. FIG. 5B shows details of the drive-transfer shaft assembly. Both shafts extend beyond the case at the bottom to which the drive-transfer pulley is mounted. In the preferred embodiment, one of the drive-transfer shafts also extends beyond the top of the case. This end of the shaft connects the drive motor 316 through a flexible drive coupling 362.

In a preferred embodiment, the ball nut 302 is connected to the primary drive sprocket by a set of interlocking tapered ring connection that locks the sprocket to the ball nut by means of friction. Other approaches to locking the ball nut to the sprocket include keyway, setscrew, and a single piece ball nut-sprocket. The preferred embodiment, a friction lock, offers the added benefit of infinite adjustment. This is not only beneficial during the initial machine fabrication/setup operation as a means of removing slack between each gearbox and leveling the platen/frame, but also provides adjustment to compensate for machine wear and chain elongation.

FIG. 5A is a section view of the gearbox at the ball screw location. This view best shows the details of the ball nut/drive sprocket assembly. The ball nut 302 receives platen/frame loads through the gearbox case by means of two tapered roller bearings 364A, 364B that interface one at the top, and one at the bottom of the ball nut/drive sprocket assembly and upper and lower cases, respectively. The ball nut/drive sprocket assembly connects via a chain to the drive-transfer shaft assemblies, which in turn provide the motivating force as described above.

For the lower bearing 364B, the outer bearing race interfaces with the lower case and the inner bearing race interfaces with the bearing guide 366. The bearing guide 366 provides the interface between the lower bearing 364B and the ball nut 302. The guide is connected by three countersunk pins 368. The pins aid in delivering the torsion load and bolts secure the ball nut and bearing guide as a unit.

As shown in FIG. 5A, the ball nut 302 is attached to the drive sprocket 310 by means of an interlocking set of tapered rings that are clamped together by a series of bolts 370. This friction lock is sound and adequate for most applications while providing an infinite range of adjustment for assembly and maintenance.

The ball nut 302 interfaces with the upper case through a tapered roller bearing press fit into a bearing adjuster 372 that, in turn threads into the upper case. The inner (tapered roller bearing) race is fitted directly to the precision ground outer surface of the ball nut. The outer (tapered roller bearing) race is fitted to the bearing adjuster. The bearing adjuster controls the bearing play in both the upper and lower tapered roller bearings. The bearing adjuster threads into the case directly. The adjuster is tightened to remove play in both upper and lower tapered bearing sets. The adjuster is locked in place with the bearing adjuster lock bolt. When tightened, this lock bolt prevents the adjuster from rotating. A set of spanner wrench slots 374 is provided on the top surface of the bearing adjuster.

FIG. 5B shows the gearbox drive-transfer shaft assembly. In this view, the drive-transfer shaft assembly 312 is connected to an electric drive motor 316. The electric drive motor is mounted atop the gearbox connected by means of a motor standoff 380 and the drive-transfer pulley 314 mounted on the bottom of the gearbox. Alternatively, the motor and/or pulley may be mounted in the reverse configuration, i.e. motor on the bottom and pulley on top. Another secondary drive-transfer shaft 358/360 is located at the opposite corner of the gearbox as shown in FIG. 4B. The function of both drive-transfer shaft assemblies is to transfer the torque from the drive motor to the adjacent gearboxes through the drive-transfer pulleys.

The motor standoff acts as a spacer to house a flexible coupling 362 and provides the interface details that aid in assembly. The motor standoff 380 is bolted directly to the top gearbox via studs and lock nuts. The motor 316 is attached to the standoff using bolts. There is a hollow section at the center of the motor standoff that is open on one side. The hollow section provides access for the assembly of a flexible coupling 362 which connects the drive motor to the drive-transfer shaft. The flexible coupling 362 allows for slight misalignment between the drive motor shaft and the drive-transfer shaft. The flexible coupling 362 shown in FIG. 5B is a hard rubber coupling made in two interlocking sections, one attached via keyed set screw (not shown) to the drive motor shaft and the other, connected by similar means, to the drive-transfer shaft. Other flexible couplings may be used depending on design preferences. The design allows the initial assembly of each half of the flexible coupling to their respective (drive motor and drive-transfer) shafts prior to mounting to the motor standoff. Final adjustment of the coupling may be made after the motor is secured to the motor standoff.

The drive motor and shaft assembly is attached to the case by two internal bearing sets, one for the top gearbox case 340 and one for the bottom gearbox case 342. The bearing assemblies are attached to the drive-transfer shaft by keyway and set screws on the inner bearing race. This design allows the shaft to be locked into position. The outer bearing races are press fit into their respective (upper and lower) cases, which incorporate a tight tolerance, machined pockets. The secondary drive-transfer sprocket is mounted between the upper and lower bearing sets. This sprocket transfers the motivating force to the ball screw assembly discussed above.

The drive-transfer shaft 312 extends below the lower case 242. The drive-transfer pulley 314 is mounted externally to the drive-transfer shaft on the bottom side of the lower case. The drive-transfer pulley provides the power takeoff path to connect the driving force from the one driver gearbox to the adjacent slave gearbox assemblies 320, 324. The same is true for the slave drive-transfer shaft assembly 322 located at the opposite corner of the press platen. Note that the other (slave) drive-transfer shaft assemblies do not require drive motors. The drive transfer-chain 328 connects the shafts to each other and the ball nut/drive sprocket assemblies. For safety reasons, a belt guide cover preferably is used to cover the drive-transfer pulleys and belts.

An essential feature and advantage of this invention is that the gearbox and pulley arrangement provides a redundant safety system. Should the drive-transfer chain fail (break) the drive-transfer pulley and belt provide the load path to the adjacent gearbox. This redundancy provides an inherently safe motion system.

Another embodiment of the gearbox incorporates an internal drive-transfer pulley and belt configuration. The same description for the ball nut and the primary drive-transfer sprocket holds true. The difference lies in the size of the case. The case height is increased to allow for the inclusion of the drive-transfer pulley within the case. This configuration keeps all rotating components within the frame members and case. Access to tighten the setscrew(s) is gained by threaded holes in the case which are capped after assembly is complete (not shown). The drive-transfer belts feed through the box beam frame members to connect adjacent gearboxes. Within the frame member is mounted a belt-tensioning device.

Features and advantages of the lift platen drive system of the present invention are that: (1) the drive is versatile with respect to motion control (i.e. provides precise control over speed, acceleration and displacement); (2) maintains platen parallelism during non-uniform loading; (3) is capable of applying high load; (4) is capable of running multiple platens on a single set of guide rod/tie bars; (5) is clean operating (no messy hydraulic oil).

Typical prior art mechanical systems currently available are hydraulic or pneumatic cylinder actuated clamp systems. Parallelism is maintained by racks mounted to columns with pinion gears on transfer shafts linked by right angle gearboxes. Such linked rack and pinion systems attempts to maintain parallelism by running the rack in unison, however, such rack-based systems are not precise due to the stacking of tolerances from rack to rack and gearbox to gearbox. They also require high maintenance (grease/oil lubrication) and the lubricants may contaminate the work area. Likewise the platen design is heavy because of the extra thick cross-section of the platens necessary to house bearings/bushings at guide/tie rod locations. The bushings are often long or require double bearing sets at each corner. In some instances the design may incorporate a combination of long bearings and rack teeth cut directly into guide rods. Overall, systems with large mass platens are costly due to the hydraulic pumps and cylinders and large gage guide rods and bearings necessary to move the heavy platens. Hydraulics are also messy with respect to the fluids and leaky lines. Pneumatics are not very precise and tend to have a lot of "bounce" in the system due to the compressibility of gas under pressure.

Electric drive systems for heavy lift applications focus on turning the drive screw (ball of ACME thread) rather than turning the drive nut. However, as noted above, these systems are limited by the speed at which the screw can spin without causing the screw to whip like a jump rope. This whipping phenomenon limits not only the screw speed, but also the screw length and diameter. Available systems that drive the "nut" drive are limited to light duty cycles and limited load capacity.

Referring again to FIG. 1 and FIG. 2, emitter platen 150 also comprises an essentially rectangular frame assembly which includes an electric motor drive mechanism identical to that used on press platen 80. Emitter platen 150 is upwardly and downwardly movable, and the position, velocity, and acceleration of heating platen 150 can be computer controlled.

An arm 151 is attached to, and extends downwardly from, emitter platen 150. The length of arm 151 is adjustable. Electromagnetic energy emitting device 152 is disposed on the distal end of arm 151. The attachment between arm 151 and device 152 allows 360° movement of the emitting element in both the horizontal and vertical directions thereby providing the maximum degree of flexibility with respect to the spatial orientation of that emitting element. In a preferred embodiment, quartz heating elements 152 which emit infrared energy are separately attached to emitter platen 150, each such heating element being attached to a separate arm in the manner described above.

Figure 6:
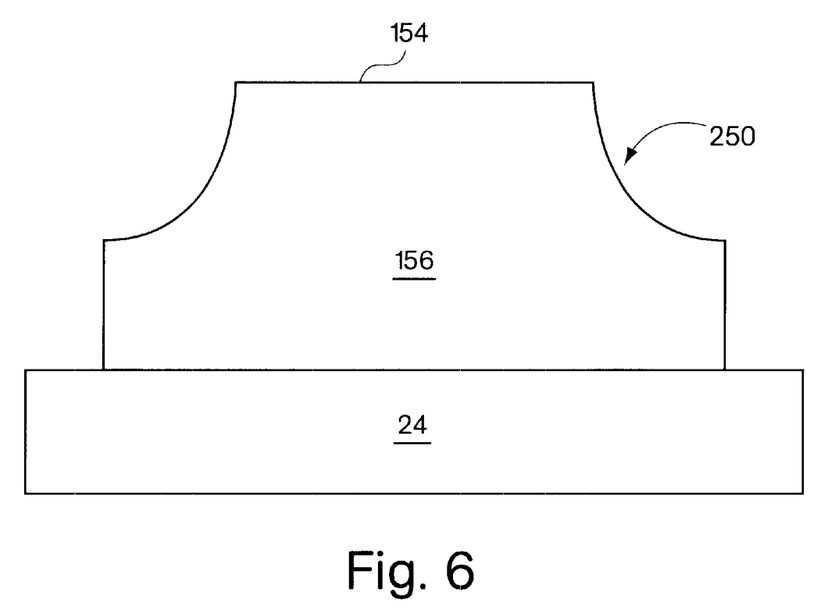
FIG. 6 is a side elevational view of a shuttle table and forming tool used in the apparatus of FIG. 1.

A particular advantage of the apparatus and process of the present invention is the use of low cost tooling to manufacture structural preforms. Referring to FIG. 6, the thermoforming process begins with placement of forming tool 250 onto shuttle table 24 while shuttle table 24 is in loading station 12. Tool 250 is a first mold part which comprises the male portion of the forming mold. Diaphragm 82 disposed on press platen 80 comprises the second mold part.

Tool 250 defines the 3-dimensional shape of the desired structural preform, and comprises outer surface 154 disposed on interior portion 156. Outer surface 154 can be formed from a metal such as steel, aluminum and the like, or can be formed from wood, plaster or a composite material. Interior face portion 156 of forming tool 250 may comprise wood, metal, plastic or a rigid foam as required to stabilize the tool under atmospheric pressure.

Figure 7:
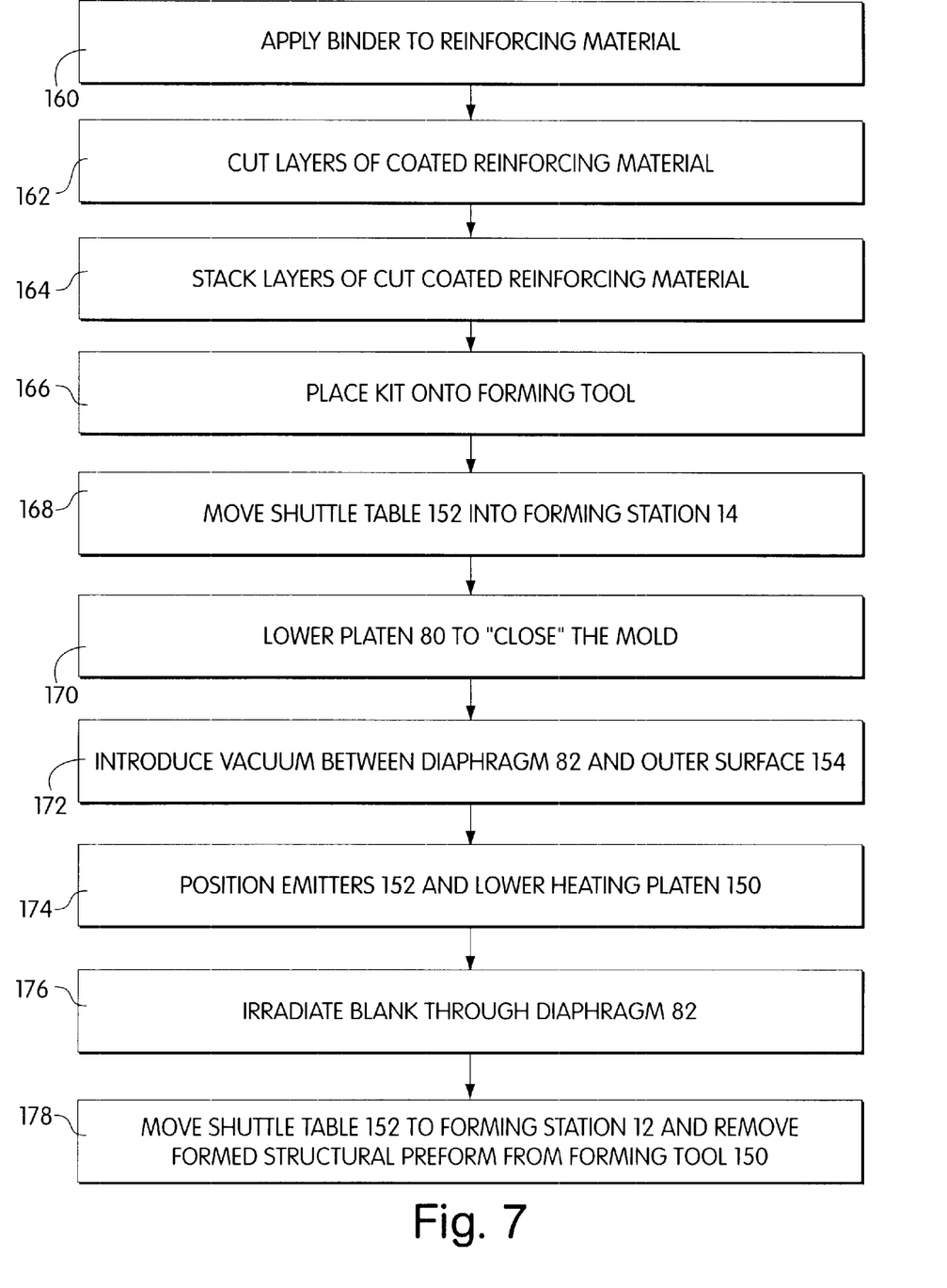
FIG. 7 is a flow chart describing the steps in a first embodiment of the process of the present invention.

Turning to the flow chart of FIG. 7, a typical process for practicing the invention to form structural preforms is illustrated as first comprising a step 160 of applying a binder material to the reinforcing material. The reinforcing material typically comprises an engineered textile including woven fabrics, multi-warp knitted fabrics, unidirectional fabrics, braided socks and fabrics, narrow fabrics and tapes, and fully-fashioned knit fabrics. These fabric materials are typically formed of fiber glass, carbon fiber, aramid fibers, polyethylene fibers, or mixtures thereof.

The binder composition used in this process preferably comprises a curable resin that is activated by or responds to the application of electromagnetic energy. Preferably the resin comprises a thermoset and/or thermoplastic resin containing a small amount, e.g. up to about five weight percent lamp black. The binder may be applied by spraying, rolling or calendaring to a degree sufficient to coat the fibers of the reinforcing material without filling the interstices between the fibers. The interstices between the fibers need be kept unfilled in order to allow filling of same in a subsequent molding process using the preform made according to the present invention.

Single or multiple layers of the coated reinforcing material can be used. In the case of multiple layers, the layers are stacked as shown in step 164 prior to curing the binder resin. Typically, between four and eight layers of reinforcing material are used. Each layer is designed with the fibers oriented in a specific direction necessary to distribute the loads applied to the finished structural preform.

As shown in step 162, the coated but uncured reinforcing layers of material are first cut into a predetermined pattern, i.e. a blank or "kit", that allows it to conform to the contours of forming tool 250, and the cut layers stacked. In the alternative, layers may be coated with binder, and stacked, and the stack then cut into a predetermined pattern to form the blank or kit.

As depicted in step 166, the binder-coated blank or kit is then laid up in lay-up station 12 onto forming tool 250, and the blank is held in place in the lay-up station 12 by means of a vacuum or negative air-flow which assists in holding the blank in place and in shape until the diaphragm 82 is brought down over the blank as discussed below. In step 168, shuttle table 24 is moved from lay-up station 12 to forming station 14. Locking pins 30 are then moved downwardly into holes 34 thereby securing shuttle table 24 in place. Movement of locking pins 30 into the locking position can be accomplished manually or by automated computer control.

Figure 8:
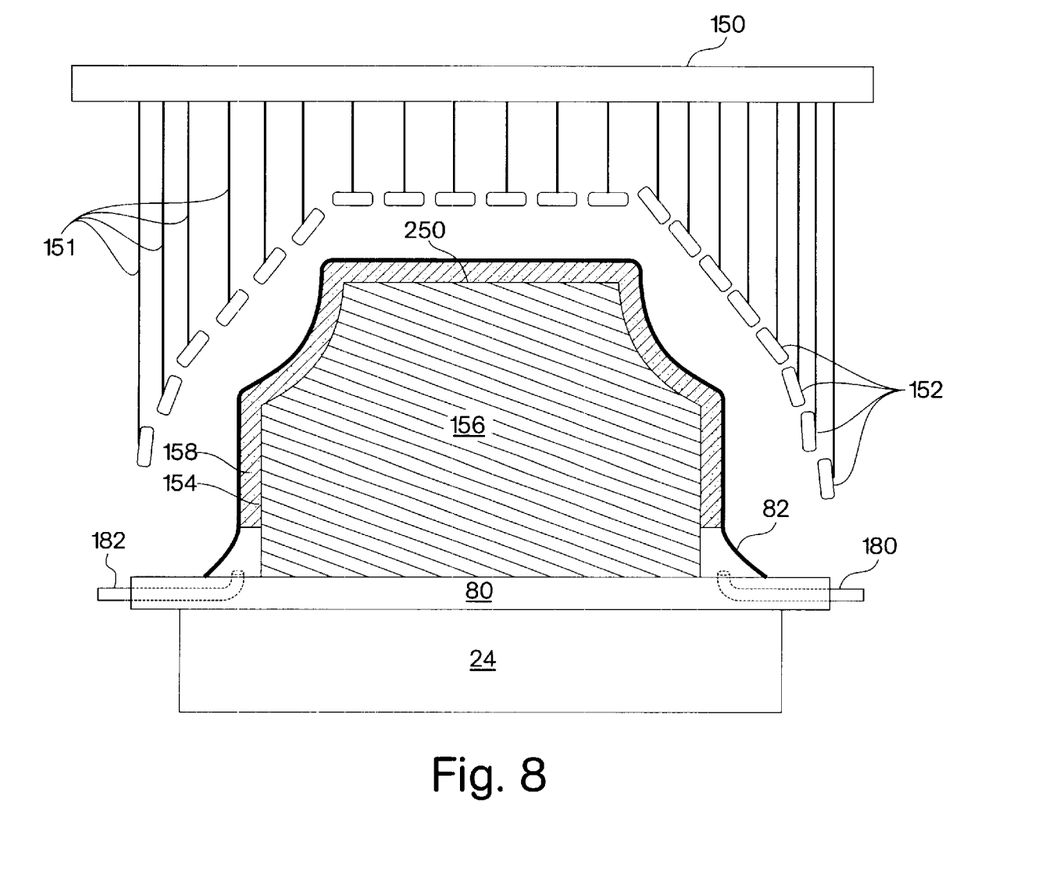
FIG. 8 is a partial side view of a forming station in accordance with the present invention showing a forming tool, shuttle table, press platen, elastomeric diaphragm, emitter platen, and electromagnetic energy emitters.

An electrical interconnect prevents downward movement of horizontal platen 80 until locking pins 30 have been moved into the locked position. After shuttle table 24 has been secured in the locked position in forming station 14, and as shown as step 170 in FIG. 7, horizontal platen 80 is lowered using the drive mechanism described above. Referring to FIG. 8, as platen 80 moves downward, diaphragm 82 stretches to encapsulate tool 250, compressing blank 158 against outer surface 154 thereby "closing" the mold. Application of vacuum forces the diaphragm to encapsulate bridged or concave surfaces. By compressing blank 158 against outer surface 154, diaphragm 82, i.e. the second mold part, 2 forms the binder-coated reinforcing material into the 3-dimensional shape of the desired structural preform.

As shown in FIG. 8, press platen 80 includes vacuum ports 180 and 182, the distal ends of which are disposed on the upper surface of press platen 80. Vacuum ports 180 and 182 extend through the interior of press platen 80, such that the proximal ends extend outwardly from the sides of press platen 80. Vacuum tubing and a vacuum valve (not shown in FIG. 8) connect the proximal ends of vacuum ports 180 and 182 to vacuum surge tank 38. As shown in step 172 in FIG. 7, after press platen 80 has made an air-tight seal with shuttle table 24, the vacuum valve is opened thereby introducing a vacuum between diaphragm 82 and outer surface 154 thereby further compressing blank 158 against outer surface 154.

In step 174, heating platen 150 is lowered using the electric drive mechanism described above. Prior to lowering platen 150, the orientations of the individual electromagnetic energy emitters 152 are adjusted, as described above, to maximize the energy directed at diaphragm 82.

In step 176, electromagnetic energy is directed through diaphragm 82 to effect activation of the binder. Infrared energy comprises the preferred electromagnetic energy. In the alternative, however, ultraviolet energy, microwave energy, or an electron beam also can be used to cure the appropriate electromagnetic energy curable binder composition.

After activation of the binder, diaphragm 82 is cooled to maximize its useful lifetime, and to stabilize the formed structural preform. Such cooling is preferentially accomplished using a stream of chilled air directed against the stretched diaphragm as it compresses the formed preform against outer surface 154. In another embodiment, diaphragm 82 is also cooled during the activation cycle.

After the cooling cycle is complete, emitter platen 150 is moved upwardly using the electric drive mechanism described above. Horizontal platen 80 is then moved upwardly again using the electric drive mechanism described above. Horizontal platen 80 is raised to a height such that diaphragm 82 no longer contacts the formed structural preform. Locking pins 30 are then returned to the unlocked position, and shuttle table 24 is moved to loading station 12. The structural preform product can then be removed from forming tool 250.

Figure 9:
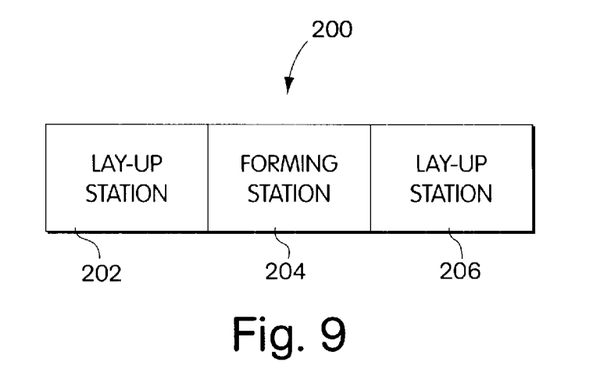
FIG. 9 is a block diagram schematically depicting a second embodiment of the process and apparatus of the present invention.
Figure 10:
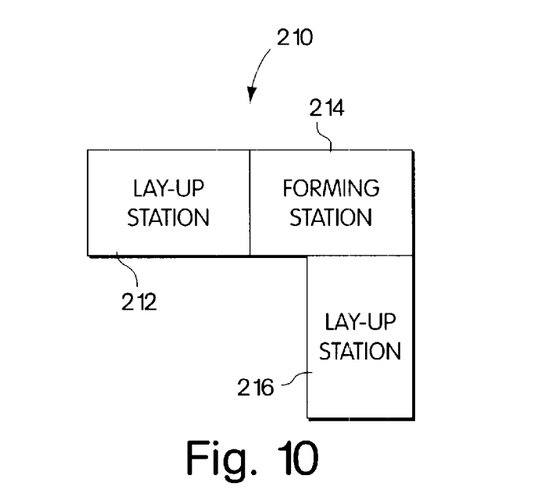
FIG. 10 is a block diagram schematically depicting a third embodiment of the process and apparatus of the present invention.

In another embodiment of Applicant's invention, Applicants' novel apparatus can include a second lay-up station. Referring to FIG. 9, first lay-up station 202 is identical in configuration to lay-up station 12 as depicted in FIGS. 1 and 2, and as described above. Forming station 204 is identical in configuration to forming station 14 as shown in FIGS. 1 and 2 and as described above, except that second lay-up station 206 is attached to, and extends outwardly from, a second side of forming station 204. As shown in FIG. 9, second lay-up station 206 can extend outwardly from the side of forming station 204 opposite to the side of forming station 204 from which first lay-up station 202 extends. In the alternative and as shown in FIG. 10, second lay-up station 206 can extend outwardly from a side of forming station 204 next to the side of forming station 204 from which first forming station 202 extends. As in the case of the first lay-up station, lay-up station 206 also includes vacuum or negative air flow to assist in holding the pattern or blank in place and in shape until the blank is shuttled into the forming station and the diaphragm brought down over the blank.

In either configuration, a forming tool, as described above, is disposed on a shuttle table, as described above, which can be moved bidirectionally from one lay-up station into the forming station and onto the other lay-up station. Therefore, a blank of reinforcing material, as described above, can be laid up on the forming tool at one lay-up station, the shuttle table carrying the forming tool/reinforcing material can be moved into the forming station and the preform made, and the shuttle table moved to the other lay-up station where the completed preform is removed from the forming tool.

Figure 11:
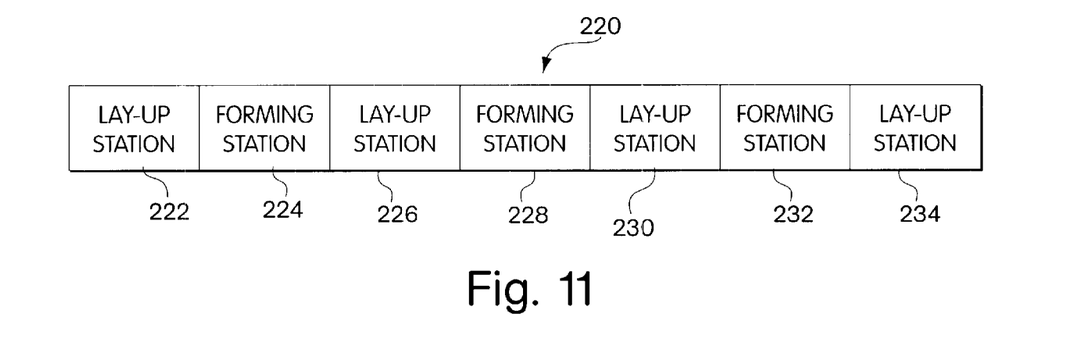
FIG. 11 is a block diagram depicting a fourth embodiment of the process and apparatus of the present invention.

In yet another embodiment, a plurality of lay-up stations can alternate with a plurality of forming stations. Referring to FIG. 11, lay-up stations 222, 226, 230, and 234 alternate with forming stations 224, 228, and 232. This embodiment allows formation of complex preforms that require multiple lay-up operations. As before, the lay-up stations 222, 226, 230 and 234 preferably include vacuum or negative air flow for holding the blank in place and in shape until the blank in shuttled into a respective forming station and the diaphragm brought down over the blank.

For example, a first reinforcing material can be laid up at a first lay-up station onto a forming tool which comprises a first mold part which is disposed on a shuttle table as described above. The shuttle table/first mold part is then moved into first forming station 224, and a first preform is made in the manner described above.

The shuttle table is then moved to second lay-up station 226. A third mold part can be added to the first mold part to form a fourth mold part which defines the 3-dimensional shape of a second structural preform. One or more layers of a second reinforcing material, which preferably comprises the same kinds of engineered textiles described above but which can differ from the first reinforcing material in size, configuration, orientation, composition, and number of layers, are coated with a second binder composition. A second binder composition is applied in the manner described above to this second reinforcing material. The binder compositions used as said second binder composition preferably comprises a thermoset or thermoplastic resin containing a small amount of lamp black. This second binder composition may be the same as the first binder composition, or it may differ. The binder coated second reinforcing material is laid up onto the fourth mold part.

The shuttle table is then moved into second forming station 228, which comprises two independently movable platens including a second plurality of electromagnetic energy emitting devices, and a second elastomeric diaphragm which functions as a fifth mold part in the manner described above. A second preform is then formed in the manner described above.

The shuttle table is then moved to third lay-up station 230. A sixth mold part can be added to the fourth mold part to form a seventh mold part which defines the 3-dimensional shape of a third structural preform. One or more layers of a third reinforcing material, which preferably comprises the same kinds of engineered textiles described above but which can differ from the first reinforcing material and/or the second reinforcing material in size, configuration, orientation, composition, and number of layers, are coated with a third binder composition. The third binder composition is applied in the manner described above to the third reinforcing material. The binder compositions used as the third binder composition preferably also comprise a thermoset or thermoplastic resin containing a small amount of lamp black. This third binder composition may be the same as the first binder composition or second binder composition, or it may differ. The binder coated third reinforcing material is laid up onto the seventh mold part at third lay-up station 230.

The shuttle table is then moved into third forming station 232, which comprises two independently movable platens including a third plurality of electromagnetic energy emitting devices, and a third elastomeric diaphragm which functions as an eighth mold part in the manner described above. A third preform is then formed in the manner described above. The shuttle table is then moved to fourth lay-up station 234 and the third preform is removed from the forming tool.

The invention is susceptible to modification. For example, while the preferred electro-mechanical platen drive mechanism has been described, it may be possible to employ electric, pneumatic or hydraulic drive direct lift mechanisms and/or pneumatic or hydraulic motors in place of the electric motor in the above-described electro-mechanical drive system under certain circumstances. However, a feature and advantage of the electro-mechanical drive system as above described is that the drive mechanism provides a redundant load path when coupled in a closed loop of three or more gearboxes, that provides precise, accurate control over platen position, speed and acceleration without the need for additional safety braking systems.

The electro-mechanical drive system as described above advantageously may be employed with other heavy lift applications such as parallel press platens for compression presses, thermoforming equipment, injection molding machines, precise stages and the like. Moreover, the electro-mechanical drive system also advantageously may be employed for heavy pallet applications, e.g. inventory control systems, frame assemblies for automated process or transport equipment. Also, the electro-mechanical lift system may be employed for light load applications where precise accurate control over parallel movement of a pallet, platen or the like is required.

It will be understood that modification and variations may be made of the above described apparatus and process, without departing from the spirit and scope of the present invention. For example, structural performs advantageously may be formed in accordance with the present invention using a conventional electric drive, hydraulic or pneumatic platen lift system. Still other changes may be made without departing from the spirit and scope of the present invention.

We claim:

1. Apparatus for manufacturing structural preforms, comprising:
    a first forming station comprising a support structure having a plurality of horizontal and vertical members;
    a first movable horizontal platen disposed within the interior of said forming station;
    a second movable horizontal platen disposed within the interior of said forming station and above said first movable horizontal platen;
    said first horizontal platen being vertically movable between a raised and a lowered position, and comprising a first frame having a first top surface with a first plurality of vacuum ports disposed on said first top surface, said first frame surrounding and supporting a first elastomeric diaphragm which is substantially transparent to electromagnetic energy;
    said second horizontal platen being vertically movable between a raised and a lowered position, and comprising a first plurality of arms connected to and extending downwardly from said second movable horizontal platen;
    a plurality of first electromagnetic energy emitters disposed at a distal end of each of said first plurality of arms;
    a cooling device operatively disposed for cooling said first elastomeric diaphragm;
    a first lay-up station comprising a support structure having a plurality of horizontal and vertical members, wherein the proximal end of said first lay-up station is attached to a first side of said first forming station;
    a shuttle table slidingly-connected to said first lay-up station and slidingly5 connected to said first forming station, whereby said shuttle table can be moved bidirectionally from a first position disposed on said first lay-up station to a second position disposed within the interior of said first forming station and back to said first position, wherein said second position is disposed beneath said first movable platen;
    a locking device for selectively securing said shuttle table at said first or said second position;
    a first forming tool disposed on said shuttle table, wherein said first forming tool comprises a first outer surface disposed on a first interior portion; and
    a vacuum surge tank operatively connected to said first plurality of vacuum ports for applying vacuum contemporaneously with emission of said electromagnetic energy.

2. The apparatus of claim 1, wherein said first forming tool comprises an interior face formed of a material selected from the group consisting of metal, wood, plastic, and rigid foam.

3. The apparatus of claim 1, wherein said first electromagnetic energy emitters are selected from the group consisting of infrared energy emitters, ultraviolet energy emitters, microwave energy emitters, and electron beam energy emitters.

4. The apparatus of claim 1, wherein said first electromagnetic energy emitters are spacially adjustable.

5. The apparatus of claim 1, wherein said first elastomeric diaphragm comprises a silicon rubber.

6. The apparatus of claim 1, further comprising a second lay-up station, wherein said second lay-up station comprises a support structure formed from a plurality of horizontal and vertical members, wherein said second lay-up station is attached to, and extends outwardly from, a second side of said first forming station;
    wherein said shuttle table is further slidingly-connected to said second lay-up station, whereby said shuttle table can be moved bidirectionally from said second position to a third position disposed on said second lay-up station; and
    a locking device for selectively securing said shuttle table at said third position.

7. The apparatus of claim 6, further comprising a second forming station, wherein said second forming station comprises a support structure formed from a plurality of horizontal and vertical members, wherein a distal end of said second lay16 up station is attached to a first side of said second forming station, and wherein said second forming station further comprises a third horizontal platen vertically movable between a raised and a lowered position, and disposed within the interior of said second forming station, and wherein said second forming station further comprises a fourth horizontal platen vertically moveable between a raised and a lowered position, and disposed within the interior of said second forming station and above said third horizontal platen;

wherein said third horizontal platen comprises a second frame having a second top surface with a second plurality of vacuum ports disposed on said second top surface, and wherein said second frame surrounds and supports a second elastomeric diaphragm, wherein said second elastomeric diaphragm is substantially transparent to electromagnetic energy;

wherein said fourth horizontal platen comprises a second plurality of arms connected to and extending downwardly;

a plurality of second electromagnetic energy emitters disposed on a distal end of each of said second plurality of arms;

a lifting device for raising and lowering said third horizontal platen;

a lifting device for raising and lowering said fourth movable horizontal platen;

a cooling device for cooling said second elastomeric diaphragm;

a third lay-up station comprising a support structure formed from a plurality of horizontal and vertical members, wherein said third lay-up station is attached to, and extends outwardly from, a second side of said second forming station;

wherein said shuttle table is also slidingly-connected to said second forming station and is also slidingly-connected to said third lay-up station, such that said shuttle table can be moved bidirectionally from said third position to a fourth position disposed within the interior of said second forming station, and from said fourth position to a fifth position disposed on said third lay-up station, wherein said fourth 2 position is disposed beneath said third movable horizontal platen;

a locking device for securing said shuttle table at said fourth or said fifth position;

a second forming tool disposed on said shuttle table, wherein said second forming tool comprises a second outer surface disposed on a second interior portion; and     a vacuum surge tank operatively connected to said second plurality of vacuum ports for applying vacuum contemporaneously with emission of said electromagnetic energy.

8. The apparatus of claim 7, wherein said second forming tool comprises an interior face formed of a material selected from the group consisting of metal, wood, plastic and rigid foam.

9. The apparatus of claim 7, wherein said second electromagnetic energy emitters are selected from the group consisting of infrared energy emitters, ultraviolet energy emitters, microwave energy emitters, and electron beam energy emitters.

10. The apparatus of claim 7, wherein said second electromagnetic energy emitters are spacially adjustable.

11. The apparatus of claim 10, wherein said second elastomeric diaphragm comprises a silicon rubber.

12. The apparatus of claim 7, further comprising a third forming station, wherein said third forming station comprises a support structure formed from a plurality of horizontal and vertical members, wherein a distal end of said third lay-up station is attached to a first side of said third forming station, and wherein said third forming station further comprises a fifth horizontal platen vertically moveable between a raised and a lower position and disposed within the interior of said third forming station, and wherein said third forming station further comprises a sixth horizontal platen vertically movable between a raised and a lowered position, and disposed within the interior of said third forming station and above said fifth movable horizontal platen;

wherein said fifth horizontal platen comprises a third frame having a third top surface with a third plurality of vacuum ports disposed on said third top surface, and wherein said third frame surrounds and supports a third elastomeric diaphragm, wherein said third elastomeric diaphragm is substantially transparent to electromagnetic energy;

wherein said sixth horizontal platen comprises a third plurality of arms connected to and extending downwardly;

a plurality of third electromagnetic energy emitters disposed on a distal end of each of said third plurality of arms;

a lifting device for raising and lowering said fifth movable horizontal platen;

a lifting device for raising and lowering said sixth movable horizontal platen;

a cooling device for cooling said third elastomeric diaphragm;

a fourth lay-up station comprising a support structure formed from a plurality of horizontal and vertical members, wherein said fourth lay-up station is attached to and extends outwardly from a second side of said third forming station;

wherein said shuttle table is also slidingly-connected to said third forming station and is slidingly-connected to said fourth lay-up station, such that said shuttle table can be moved bidirectionally from said fifth position to a sixth position disposed within the interior of said third forming station, and from said sixth position to a seventh position disposed on said fourth lay-up station, wherein said sixth position is disposed beneath said fifth movable horizontal platen;

a locking device for securing said shuttle table at said sixth or said seventh position;

a third forming tool disposed on said shuttle table, wherein said third forming tool comprises a third outer surface disposed on a third interior portion; and     a vacuum surge tank operatively connected to said third plurality of vacuum ports for applying vacuum contemporaneously with emission of said electromagnetic energy.

13. The apparatus of claim 12, wherein said third forming tool comprises an interior face formed of a rigid material selected from the group consisting of metal, wood, plastic and rigid foam.

14. The apparatus of claim 12, wherein said third electromagnetic energy emitters are selected from the group consisting of infrared energy emitters, ultraviolet energy emitters, microwave energy emitters, and electron beam energy emitters.

15. The apparatus of claim 12, wherein said third electromagnetic energy emitters are spacially adjustable.

16. The apparatus of claim 12, wherein said third elastomeric diaphragm comprises a silicon rubber.

17. The apparatus of claim 1, wherein said first lay-up station comprises a blower or vacuum for creating negative air flow through said support structure.

18. The apparatus of claim 6, wherein said second lay-up station comprises a blower or vacuum for creating negative air flow through said support structure.

19. The apparatus of claim 7, wherein said third lay-up station comprises a blower or vacuum for creating negative air flow through said support structure.

20. The apparatus of claim 12, wherein said forth lay-up station comprises a blower or vacuum for creating negative air flow through said support structure.

21. Apparatus for manufacturing structural preforms, comprising:

a first forming station comprising a support structure having a plurality of horizontal and vertical members;

a first movable horizontal platen disposed within the interior of said forming station;

a second movable horizontal platen disposed within the interior of said forming station and above said first movable horizontal platen;

said first horizontal platen being vertically movable between a raised and a lowered position, and comprising a first frame having a first top surface with a first plurality of vacuum ports disposed on said first top surface, said first frame surrounding and supporting a first elastomeric diaphragm which is substantially transparent to electromagnetic energy;

said second horizontal platen being vertically movable between a raised and a lowered position, and comprising a first plurality of arms connected to and extending downwardly from said second movable horizontal platen;

a plurality of first electromagnetic energy emitters disposed at a distal end of each of said first plurality of arms;

a cooling device operatively disposed for cooling said first elastomeric diaphragm;

a first forming tool connected to said first forming station and capable of being disposed within the interior of the first forming station beneath the first movable platen, wherein said first forming tool comprises a first outer surface disposed on a first interior portion; and a vacuum surge tank operatively connected to said first plurality of vacuum ports for applying vacuum contemporaneously with emission of said electromagnetic energy.

22. Apparatus for manufacturing structural preforms, comprising:

a first forming station comprising a support structure having a plurality of horizontal and vertical members;

a first movable horizontal platen disposed within the interior of said forming station;

a second movable horizontal platen disposed within the interior of said forming station and above said first movable horizontal platen;

said first horizontal platen being vertically movable between a raised and a lowered position, and comprising a first frame having a first top surface with a first plurality of vacuum ports disposed on said first top surface, said first frame surrounding and supporting a first elastomeric diaphragm which is substantially transparent to electromagnetic energy;

said second horizontal platen being vertically movable between a raised and a lowered position, and comprising a first plurality of arms connected to and extending downwardly from said second movable horizontal platen;

a plurality of first electromagnetic energy emitters disposed at a distal end of each of said first plurality of arms;

a cooling device operatively disposed for cooling said first elastomeric diaphragm;

a first forming tool connected to said first forming station and capable of being disposed within the interior of the first forming station beneath the first movable platen, wherein said first forming tool comprises a first outer surface disposed on a first interior portion;

a vacuum surge tank operatively connected to said first plurality of vacuum ports for applying vacuum contemporaneously with emission of said electromagnetic energy;

a drive system for controlling the position of the first moveable platen, and comprising in combination;

at least three gearboxes, each gearbox consisting of a ball nut connected via a drive chain or drive belt to two secondary drive-transfer shafts;

each of said secondary drive shafts being linked, through drive belts or drive chains to secondary drive shafts, to two adjacent gearboxes;

a fixed lead screw associated with each of said ball nuts; and a motor associated with one of said gearboxes, for driving one of said ball nuts.

* * * * *